United States Patent Office 3,825,623
Patented July 23, 1974

3,825,623
PROCESS FOR PREPARING BLOCK COPOLYMERS OF ALPHA METHYL STYRENE AND CONJUGATED DIOLEFINS
Ronald Turner La Flair, Sarnia, Ontario, Canada, assignor to Polysar Limited, Sarnia, Ontario, Canada
No Drawing. Continuation-in-part of abandoned application Ser. No. 713,301, Mar. 15, 1968. This application May 7, 1971, Ser. No. 141,395
Claims priority, application Canada, Apr. 1, 1967, 486,797; Jan. 25, 1968, 10,718
Int. Cl. C08f 19/00, 19/06, 19/08
U.S. Cl. 260—879                          8 Claims

ABSTRACT OF THE DISCLOSURE

Improved thermoplastic rubbery block copolymers have terminal blocks of polyalphamethylstyrene and at least one non-terminal block of an elastomeric polymer, such as butadiene or isoprene.

---

This application is a continuation-in-part of application Ser. No. 713,301, filed 15 March 1968 and now abandoned.

This invention relates to improved polymeric rubbery thermoplastic compositions, and methods for their preparation.

Recently styrene-butadiene block copolymers have aroused considerable interest. Linear block copolymers having two terminal blocks of polystyrene and a non-terminal block of polybutadiene or another elastomeric polymer exhibit the properties of both a rubber and a thermoplastic. Thus the compositions, without any curing, have tensile strengths of 65 kilograms per square centimetre or higher, can be extended to twice their original length without breaking, and retract rapidly to their original length on release of the extendingforce. In addition, and in contrast to conventional cured rubbers, these materials are to some degree thermoplastic. Thus on heating they soften and can be shaped by moulding. On cooling, they recover thir solid rubbery form.

Such block copolymers can be prepared using the "living polymer" technique which involves polymerization of a first monomer in solution withan anionic initiator such as butyl lithium and addition of a second monomer to the solution of the "living," non-deactivated polymer of the first monomer. Polymerization of the second monomer is initiated by the living polymer, and the second polymerizes onto the "live end" of the living polymer, thus forming a 2-block copolymer. A further amount of monomer may be added in the same way, so as to make a 3-block copolymer, and the steps can be repeated so as to form a multi-block copolymer. If the monomer in the subsequent charge is only added after complete polymerization of the previous charge, the block copolymer so formed has discrete homopolymeric segments derived from each monomer. If however the subsequent charge is made after only partial polymerization of the previous charge, copolymeric (or "overlap") blocks are formed. Blockcopolymers of general form polystyrene-polybutadiene-polystyrene, which are well-known, are commonly prepared in this way. If a difunctional anionic initiator, e.g. dilithio diisoprene, is used, the polymer of the first monomer has two live ends, and subsequent addition of the second monomer causes polymerization of this second monomer onto both ends of the polymeric block of the first monomer to form a 3-block copolymer.

These previously known thermoplastic rubbery block copolymers have certain deficiencies, however. For example, they lack strength at elevated temperatures. Also, it is not possible to achieve a good balance between tensile strength and high temperature flow properties of these previously known materials. The low temperature properties, especially for example resilience, of these prior art copolymers are generally poor.

It is an object of the present invention to provide improved thermoplastic rubbery compositions in which these deficiencies are reduced or even eliminated, and processes for their preparation.

A block copolymer of form polyalphamethylstyrene-polybutadiene - polyalphamethylstyrene is in accordance with the invention. This material is a thermoplastic rubber and has better high temperature properties than corresponding block copolymers of form polystyrene-polybutadiene-polystyrene. Also, the butadiene content of such a block copolymer can be higher than that of polystyrene-polybutadiene - polystyrene block copolymer, and the material still retains the characteristics of a thermoplastic rubber. A block copolymer of said form, when prepared by the process of this invention, has improved low temperature properties. It will be understood that other conjugated diolefinic hydrocarbons such as isoprene and other methyl substituted butadienes may be used instead of butadiene.

This invention also provides within its scope low molecular weight block copolymers having at least one non-terminal elastomeric polymer block and two terminal blocks of polyalphamethylstyrene. These materials, for example low molecular weight block copolymers of general form polyalphamethylstyrene - polybutadiene-polyalphamethylstyrene, show a balance between tensile strength and high temperature flow properties which is unobtainable with block copolymers of general form polystyrene-polybutadiene-polystyrene.

To have satisfactory prope rties as a rubber in the "green" (or uncured) state, i.e. properties of at least 65 kilograms per square centimetre tensile strength and at least 100% elongation, it is necessary for the polystyrene-polybutadiene - polystyrene block copolymer to have a total molecular weight of at least about 40,000 and preferably at least about 65,000. At these and higher molecular weights, the high temperature flow properties of the materials are inadequate for certain applications. On the other hand, at lower molecular weights, the required tensile strengths in the green state are not developed in the polymers of the prior art. In contrast, a block copolymer of general form polyalphamethylstyrene-polybutadiene-polyalphamethylstyrene can be prepared with an overall molecular weight lower than 25,000 which exhibits the desired tensile strength and elongation in the green state. These block copolymers of low molecular weight have vastly superior melt flow properties along with a comparable tensile strength and elongation, as compared with styrene-butadiene block copolymers of much higher molecular weights.

The processes of preparing the thermoplastic rubbery block copolymers of the present invention show superficial similarity to the known anionic polymerization methods of preparing styrene-butadiene block copolymers. There are however important differences. Whilst styrene and alphamethylstyrene are superficially similar in chemical structure and nature, significant differences both in the methods by which they can be polymerized to form block copolymers, and in the block copolymers themselves, have been discovered.

When polymerizing alphamethylstyrene anionically, it has been found necessary to work in the presence of a polar additive. Alphamethylstyrene does not polymerize anionically at a satisfactory rate in the absence of a polar additive. It is preferred to carry out the polymerization of alphamethylstyrene in solution in an inert hydrocarbon such as benzene or hexane, to which is added a small amount of a polar additive. Suitable polar additives are those which remain liquid under the conditions of polymerization, and which do not contain active hydrogen, since this might prevent the formation of active polymeric chains. Examples of suitable polar additives are dimethoxyethane, tetrahydrofuran, hexamethyl phosphoramide, bis-(2-ethoxy ethyl) ether and di-alkyl monoethers such as dipropyl ether and di-(n-butyl) ether.

When alphamethylstyrene polymerizes anionically, apparently a reaction equilibrium is established between polymer and monomer. To increase the yield of polymer, it is necessary either to decrease the temperature of polymerization or, alternatively, to add excess monomer. In the process of the present invention it is much preferred to work at low temperatures. The reaction temperature for alphamethylstyrene polymerization should therefore be below about 15° C.

The use of low temperatures during the polymerization means of course that the solvent to be used must be selected carefully. It is desirable to use a solvent which remains liquid throughout all stages of the process. It has been found that the most satisfactory solvent is a mixture of benzene and hexane, containing a major proportion of benzene, although benzene may also be used in the absence of hexane.

For preparing block copolymers of general form polyalphamethylstyrene - polybutadiene-polyalphamethylstyrene, a coupling procedure may be used. Alphamethylstyrene is polymerized under anhydrous and oxygen-free conditions, in solution in an inert organic solvent using a mono-functional anionic, initiator, e.g. butyl lithium, and in the presence of a small amount of a polar liquid and at low temperatures, e.g. below about 15° C. After the alphamethylstyrene has polymerized, butadiene is added. The butadiene is polymerized, at a slightly elevated temperature, onto the end of the polyalphamethylstyrene, to form a 2-block copolymer.

After polymerization of the butadiene in the second step, and without deactivating the block copolymer, a coupling reagent is added to form the 3-block copolymer. The coupling reagent links two polymeric chains together through the "live" polybutadiene ends, to form the desired 3-block copolymer. It is necessary throughout the process to maintain the reaction solution anhydrous, so that the living polymeric chains are not deactivated. The coupling reagent should also be added under anhydrous conditions. Suitable coupling reagents include carbonyl sulphide, halogens, dihalo hydrocarbons, carbon disulphide, carbon dioxide, dihalo-dihydrocarbyl-silanes and the like. Especially suitable coupling reagents are the dihalo-dihydrocarbyl-silanes wherein the halogen is selected from chlorine and bromine and the hydrocarbyl group is selected from alkyl and aryl groups containing from 1 to 6 carbon atoms. They should be added in an amount of approximately one mole of coupling reagent per two moles of lithium initiator, so that each molecule of coupling reagent will react with two live polymeric chain ends.

An alternative procedure for preparing the polyalphamethylstyrene - polybutadiene - polyalphamethylstyrene polymers of the present invention involves the use of a difunctional initiator of anionic polymerization. In this procedure, butadiene is polymerized first, in solution in an inert hydrocarbon using a difunctional lithium initiator such as dilithium diisoprene. The result of this first stage of polymerization is a linear homopolymer of butadiene having two active chain ends. Monomeric alphamethylstyrene is then added to the active polymer, and polymerizes onto both ends of the polybutadiene, to form the desired 3-block copolymer. In this method also it is necessary that the temperature of polymerization of the alphamethylstyrene should be below about 15° C., and that a polar additive should be present. If desired, the polymerization of the butadiene can take place at temperatures around 50° C., and the temperature lowered immediately prior to the addition of the alphamethylstyrene. Also, the polar additive may be present during the polymerization of the butadiene, or alternatively it may be added along with the alphamethylstyrene.

A third method of preparing the polyalphamethylstyrene-polybutadiene-polyalphamethylstyrene polymers of the present invention involves a three-step polymerization process and a monofunctional initiator. Firstly, alphamethylstyrene in solution in an inert organic solvent is polymerized in the presence of a polar additive, using a suitable monofunctional polymerization initiator such as n-butyl lithium, to form living polyalphamethylstyrene. Then butadiene is added, and allowed to polymerize, to form a living 2-block copolymer. Then a further charge of alpha-methylstyrene is added, which polymerizes to form the desired 3-block copolymer. All polymerizations conveniently take place at the low temperatures previously indicated.

The resultant 3-block copolymer may be recovered from the reaction solution by precipitation with, for example, methanol and freed from solvent. The polymer is first killed by addition of a small amount of methanol. This operation is preferably also performed at temperatures below about 15° C., since as the temperature of the solution is increased, there is increased danger of depolymerization of alphamethylstyrene. After killing the polymer, the temperature is no longer critical. More methanol may then be added to precipitate the polymer. After recovery, the materials may be pressed into sheets.

In all anionic systems of polymerization, air, moisture, and proton donating impurities should be essentially eliminated, since such materials will deactivate some of the initiator and/or the living polymer. Alphamethylstyrene used in an anionic polymerization system should especially be in a high state of purity for best results, otherwise reactions may occur which deactivate the polymer during polymerization. One method of purifying alphamethylstyrene before its use in the present invention is to treat the monomer with an alkali metal compound such as lithium butyl. These reagents react with and destroy the impurities present which would cause difficulty in polymerization.

The molecular weight of the product is controlled within broad limits by the ratio of catalyst to monomers used in the polymerization. The higher the ratio of catalyst, the lower the molecular weight of the product.

The amount of polar additive to be used in any of these processes depends upon the particular compound which is being used. In all cases however, the amount is small in relation to the total amount of solvent. It has been found, however, that when too little polar additive is used, the polymerization of alphamethylstyrene is too slow. The preferred polar additive for use in the processes of the present invention is selected from the dialkyl monoethers wherein the alkyl groups contain from 3 to 6 carbon atoms, the most preferred monoether being di-(n-butyl) ether. It has been found that the optimum amount of di-(n-butyl) ether is best defined in terms of its molar ratio to the polymerization initiator used, a suitable range for this ratio being about 1:1 to about 25:1 and an optimum ratio being from about 2:1 to about 5:1. In practice, it has been found the amount of polar additive in ratio to the polymerization initiator can range to very high levels without influence on the polymerization or the polymer properties, provided that the ratio is at least about 1:1. The use as polar additive of di-(n-butyl) ether has an additional advantage which may not be readily apparent. Due to the very low solubility of di-(n-butyl) ether in water and due to the boiling point of said ether, a pollution problem associated with the use of the prior art additives is overcome. An additional benefit achieved through the use of the preferred type of polar additive is that the polybutadiene portion of the block copolymer contains the butadiene bound therein in a higher 1,4 configuration than heretofore possible when polar additives of the prior art were present in the polymerizing mixture. The 1,4 content of the polybutadiene block is from at least about 50% to less than about 80% and preferably from about 60% to about 75%. Due to the higher 1,4 content of the polybutadiene block, the block copolymer possesses improved resilience. This improved property is amply demonstrated by the ball rebound technique wherein the rebound is determined for a ball dropped under its own weight from a height of 100 cms., the ball being maintained at predetermined temperatures prior to the experiment. Preferred copolymers have a rebound of at least about 50% at 0° C.

The low molecular weight polyalphamethylstyrene-polybutadiene-polyalphamethylstyrene block copolymers are particularly interesting since they are very suitable for moulding applications. It is however extremely difficult to state the numerical values of the molecular weights of these products with a degree of precision, since a simple method of molecular weight measurement of them is not available. It is normal to measure the molecular weight of a polymer by preparing a solution of the polymer and measuring the intrinsic viscosity of the solution. The intrinsic viscosity is related to the molecular weight of the polymer.

The relationship between intrinsic viscosity and molecular weight depends upon the nature of the polymer under investigation, particularly upon such features as the chemical nature, physical nature and configuration of the polymer in solution. For well-known polymers, this relationship is well understood, and so reasonably accurate values of molecular weight for such polymers can be obtained by measurement of intrinsic viscosities.

For the novel block copolymers of the present invention however, this relationship has not been finally determined. From the intrinsic viscosities measured for these polymers, an estimate only of molecular weight can be made, as opposed to an accurate determination. For this reason, it is preferred to define these products in terms of their intrinsic viscosities rather than molecular weights.

It is estimated that for these block copolymers, an intrinsic viscosity of 0.25, as measured on a dilute solution of the polymer in toluene at 30° C., correspond to a molecular weight of the order of 17,000. A similarly measured intrinsic viscosity of 1.0 corresponds to a molecular weight of the order of 85,000.

The block copolymers of the present invention having good physical properties in the green state are those which have an intrinsic viscosity of at least about 0.25. The low molecular weight block copolymers especially suitable for moulding applications have intrinsic viscosities not exceeding about 0.50. Block copolymers having intrinsic viscosities up to about 1.0 possess a useful balance of properties including high tensile strength at room temperature, good tensile strength at elevated temperatures, acceptable flow properties as for moulding applications, and good resilience at temperatures as low as −30° C. Useful compositions contain from about 50 to about 90 weight percent of the conjugated diolefinic hydrocarbon. Useful compositions are those in which the conjugated diolefinic hydrocarbon is selected from butadiene and from isoprene and especially useful compositions are those in which said diolefinic hydrocarbon is butadiene-1,3 and the rubbery block derived therefrom contains from about 55 to about 85 weight percent of the copolymer, the polybutadiene having a 1,4 content of at least about 50%.

84410 slack w r (nite lino detail day pats) 7-2-74 ma 7

In thermoplastic rubbers which comprise block copolymers having an elastomeric non-terminal polymeric block and a non-elastomeric terminal block, such as polystyrene-polybutadiene-polystyrene block copolymers, the thermoplastic characteristics are imparted to the material by the non-elastomeric polymeric blocks and the rubbery characteristics by the elastomeric polymeric blocks. There are limits to the relative amounts of monomers which can be present and the polymer still be useful as a thermoplastic rubber. For styrene-butadiene block copolymers, the maximum butadiene content is in the region of eighty weight per cent. Block copolymers with higher butadiene contents are normally lacking in tensile strength. With alphamethylstyrene containing block copolymers of the present invention, however, this limit is surprisingly changed. For polymers of general form polyalphamethylstyrene-polybutadiene-polyalphamethylstyrene, the butadiene content may be increased to as much as ninety weight percent as hereinbefore stated, and the thermoplastic rubbery properties still retained. Materials with lower contents of non-elastic materials are desirable, because they exhibit properties more like those of a conventional rubber, such as lower set, faster relaxation, etc.

Also as previously noted, one of the disadvantages of polystyrene-polybutadiene-polystyrene block copolymers is their lack of strength at elevated temperatures. Thus at temperatures of up to about 80° C., the tensile strength of these block copolymers is generally below 15 kg./sq. cm. which makes them of limited value in many applications. The higher molecular weight block copolymers of the present invention are much improved in this respect, and acceptable tensile strengths at elevated temperatures may be achieved without sacrifice of elastic properties.

The invention will be further described with reference to specific examples.

The materials produced in the examples are subjected to physical strength tests in the green state, in the conventional manner. This involves cutting microdumbbells of width 0.1 inches from a pressed sheet of the polymer, of thickness 0.025 inches, and testing these dumbbells on an Instron Tester. The test temperature may be readily varied from room temperature by means of enclosing the test sample by a constant temperature oven which may be set at any desired temperature up to about 80° C., the sample being tested after thermal equilibrium is established.

The thermoplastic properties where recorded are determined using an Instron capillary rheometer. In this instrument, the polymer is kept at a constant elevated temperature in a vessel provided with a capillary tube extending from its bottom wall. A plunger is moved downwards onto the polymer in the vessel, at a constant speed. The plunger applies a deforming force at constant speed to the polymer. From the speed of the plunger, taking into account the geometry of the instrument and the size of the capillary, the apparent shear rate of the force applied to the polymer is calculated. The resistance to flow, i.e. the force, exerted by the polymer on the moving plunger is measured, which gives the apparent shear stress exhibited by the polymer at the temperature of measurement and at the apparent shear rate applied. The lower this apparent shear stress of course, the less the resistance to flow offered by the polymer, and so the better its thermoplastic flow properties. One means of determining the resilience of a polymer is to measure the percentage rebound of a rubber ball, comprised of that polymer, under standard conditions. A solid metal base plate, about six inches square and one inch thick is attached to one end of a meter rule in such a way that the top of the base plate corresponds to zero on the meter rule. At the top of the meter rule, which is maintained in an exactly vertical position, is located a vacuum actuated means for holding and retaining a rubber ball, which ball is one inch in diameter. The balls are preheated or precooled to the test temperature, transferred to the holding means, dropped onto the base plate and the height to which the ball rebounds is observed on the meter rule. The rebound is expressed as a percentage of the drop height.

Example 1

In this example, a high molecular weight block copolymer of general form polyalphamethylstyrene-polybutadiene-polyalphamethylstyrene was prepared as follows.

To a carefully dried 30 oz. polymerization bottle were added 350 mls. of dry benzene and 150 mls. of dry hexane, to form a mixed solution. 80 mls. of pure grade butadiene were then added, followed by 1.4 mls. of a solution of the difunctional anionic initiator dilithium diisoprene. This solution was 1.25 molar with respect to lithium. The bottle was capped, put into a polymerizer at 50° C. and allowed to polymerize at this temperature for two hours.

35 mls. of alphamethylstyrene were treated with 14 mls. of a solution of sodium naphthalide in tetrahydrofuran for purification, at which stage the monomer assumed a slightly red coloration. This indicated that the sodium naphthalide had reacted with the harmful impurities present and the residual sodium naphthalide was beginning to react with the alphamethylstyrene. The polymerization bottle was cooled to $-8°$ C. and the mixture of alphamethylstyrene and tetrahydrofuran injected into the bottle. Polymerization proceeded at this temperature for a period of 48 hours. Then the solution was deactivated whilst maintained at $-8°$ C., the polymer recovered, dried, washed with pentane and was tested. It had an intrinsic viscosity at 30° C. in toluene of 1.09. The polymer was subjected to strength tests in the normal way, using micro-dumb-bells of polymer of thickness 0.6 mms. and width 2.4 mms. cut from the dried, pressed polymer sheets on an Instron Tester. The test results at 80° C. were obtained by testing a sample in an air chamber maintained at 80° C.

TABLE I

| aMs, weight percent | Bd., weight percent | Tensile strength, kg./cm.$^2$ | | Elongation, percent | | 100% modulus, kg./cm.$^2$ | | 300% modulus, kg./cm.$^2$ | |
|---|---|---|---|---|---|---|---|---|---|
| | | 25° C. | 80° C. | 25° C. | 80° C. | 25° C. | 80° C. | 25° C. | 80° C. |
| 27 | 73 | 103.5 | 50.3 | 700 | 720 | 24.2 | 16.5 | 44.5 | 24.2 |

Example 2

In this example, a high molecular weight block copolymer of general form polyalphamethylstyrene-polybutadiene-polyalphamethylstyrene was prepared in the same way as in Example 1, except that 500 mls. of benzene was used as solvent, 13.5 mls. of tetrahydrofuran was mixed with the 40 mls. of alphamethylstyrene, and the alphamethylstyrene and ether mixture was added to the bottle at 0° C. Polymerization took place at $-8°$ C. for a period of 48 hours. The resulting polymer had an intrinsic viscosity of 0.924. The results of analysis and testing are given in Table II.

TABLE II

| aMs, weight percent | Bd., weight percent | Tensile strength, kg./cm.$^2$ | | Elongation, percent | | 100% modulus, kg./cm.$^2$ | | 300% modulus, kg./cm.$^2$ | |
|---|---|---|---|---|---|---|---|---|---|
| | | 25° C. | 80° C. | 25° C. | 80° C. | 25° C. | 80° C. | 25° C. | 80° C. |
| 37 | 63 | 184.5 | 80.0 | 700 | 440 | 61.2 | 50.9 | 100 | 72.7 |

Example 3

In this example, low molecular weight polyalphamethylstyrene-polybutadiene-polyalphamethylstyrene 3-block copolymers were prepared having different intrinsic viscosities.

For the preparation of samples A and B, a measured amount of solvent consisting essentially of a benzene-hexane mixture and a small quantity of a suitable polar additive, dimethoxy ethane (DME), were placed in a dry 30 ounce bottle, along with the required amount of alphamethylstyrene. N-butyl lithium was then added slowly with agitation until a faint yellow colour was produced, indicating that all the impurities in the solution had been purged. The required amount of n-butyl lithium for polymerization was then added, whereupon a dark red colouration, indicating the presence of alphamethylstyrene anions, was formed. Each capped bottle was placed in a freezer at $-15°$ C. for a period of about 16 hours. The required amount of dry butadiene was then added at $-15°$ C. This caused the solution to turn yellow. The solution was kept at $-15$- C. for a further two hours while the butadiene polymerized. After this time, the solution became red in colour, indicating that all the butadiene had polymerized.

Carbonyl sulphide, COS, in the required amount was then added to couple the living 2-block copolymer and produce the desired 3-block polyalphamethylstyrene-polybutadiene-polyalphamethylstyrene copolymer. The product was recovered by precipitation with a mixture of ethanol and ditertiary butyl para-cresol (Deenax, a well-known commercial antioxidant), separated from solvent, dried and pressed.

Sample C was prepared in substantially the same manner as samples A and B, except that the solvent was benzene, the polar additive was tetrahydrofuran (THF) and the temperature of polymerization was 0° C.

From the yield of polymer obtained and the initial charges of the two monomers and assuming that the butadiene added polymerizes to 100% conversion the alphamethylstyrene content of the product can be calculated.

The amounts of the ingredients used and the results of the stress-strain tests carried out on the raw polymer as previously described were shown in Table III.

TABLE III

| Run | A | B | C |
|---|---|---|---|
| Benzene (mls.) | 350 | 350 | 500 |
| Hexane (mls.) | 150 | 150 | |
| DME (mls.) | 2.0 | 2.0 | |
| THF (mls.) | | | 25 |
| n-Butyl lithium (mms.) | 8.0 | 5.0 | 5.0 |
| Alphamethylstyrene (grams) | 36.4 | 36.4 | 57.3 |
| Temperature (° C.) | −15 | −15 | 0 |
| Butadiene (grams) | 53.6 | 53.6 | 53.6 |
| Gaseous COS (mls. at atmospheric pressure) | 100 | 100 | 100 |
| Yield of polymer (grams) | 71 | 76 | 79 |
| Alphamethylstyrene content, weight percent | 25 | 30 | 32 |
| [$\eta$] of final polymer | 0.31 | 0.43 | 0.41 |
| Tensile strength (kg./cm.$^2$) | 67 | 223 | 118 |
| Elongation at break (percent) | 400 | 480 | 310 |

Example 4

In this example two further block copolymers of the same general form as, but having different molecular weights from, those of Example 3 were prepared. Their method of preparation was generally as described in Example 3. In both of these runs, the solvent used was a mixture of 350 mls. benzene and 150 mls. hexane. The polar additive in both cases was 2 mls. of dimethoxyethane (DME), the temperature of polymerization was $-15°$ C. and coupling was effected by injection of 100 mls. of gaseous carbonyl sulphide (measured at atmospheric temperature and pressure).

In addition to the stress-strain properties, the flow properties of these products were measured in accordance with the method previously described. The temperature of this measurement was 150° C. The results are recorded in Table IV.

TABLE IV

| Run | 1 | 2 |
|---|---|---|
| n-Butyl lithium (mms.) | 7.0 | 6.0 |
| Alphamethylstyrene (grams) | 36.4 | 36.4 |
| Butadiene (grams) | 53.6 | 53.6 |
| Yield of polymer (grams) | 74 | 70 |
| Alphamethylstyrene content, weight percent | 28 | 24 |
| $[\eta]$ of final polymer | 0.34 | 0.38 |
| Tensile strength (kg./cm.²) | 158 | 174 |
| Elongation at break (percent) | 470 | 450 |
| Apparent shear stress at 38 sec¹ shear rate (dynes/cm.²×10⁴) | 10.6 | 27.2 |
| Apparent shear stress at 1.52 sec¹ shear rate (dynes/cm.²×10⁴) | 0.2 | 0.9 |

Example 5

In this example is described the preparations of further block copolymers using a glass reactor for the polymerization. A measured volume of previously dried benzene was added to a sealed dry 1 gallon glass reactor followed by the calculated amount of purified alphamethylstyrene. The volume shown of di-(n-butyl) ether was then added and the mixture purified by adding small incremental additions of n-butyl lithium, the contents of the reactor being well agitated. When a blood red color was produced in the contents of the reactor this indicated that all the impurities in the solution had been purged. The calculated quantity of n-butyl lithium was then added to initiate the polymerization of the alphamethylstyrene. The temperature of the contents of the reactor was reduced and maintained essentially constant, at the level indicated in Table V for the polymerization times also shown therein. At the expiry of the time indicated about 50 mls. of butadiene was added. A further quantity of purified benzene was then added followed by the calculated quantity of butadiene. This butadiene was added in about five equal increments in order that the heat released by polymerization be distributed over a longer period of time. The butadiene polymerization was continued for the times indicated. Following this, the calculated quantity of a coupling agent, as indicated in Table V, was added to the reactor in order to couple the living 2-block copolymer to produce the desired 3-block polyalphamethylstyrene-polybutadiene-polyalphamethylstyrene copolymer. The block copolymer was recovered by precipitation in ethanol containing di-tertiary-butyl para-cresol as antioxidant, separated and dried. The properties of the copolymers are listed in Table V.

In the experiments listed in Table V, the ratio of the moles of ether per mole of n-butyl lithium ranged from a low of 2:1 for experiment No. 5 through 5.8:1 for experiment No. 2 to a high of 24:1 for experiment No. 4. The ball rebound is a procedure for determining the resilience of a rubber. Balls of 0.75 inch diameter were molded from the block copolymers. A measureing stick of 100 cm. length was held in the vertical position upward from a steel base. A ball, cooled to 0° C., was held at the 100 cm. mark of the measuring stick and released. The height to which the ball rebounded was observed for a drop of 100 cms.

TABLE V

| Experiment number | 1 | 2 | 3 | 4 | 5 |
|---|---|---|---|---|---|
| First block: | | | | | |
| Benzene, mls | 320 | 320 | 480 | 240 | 220 |
| Di-n-butyl ether, mls | 18 | 18 | 27 | 100 | 9 |
| α-methylstyrene, mls | 480 | 480 | 720 | 430 | 580 |
| Butyl lithium mmoles | 16.3 | 18.6 | 23.5 | 24.5 | 29.5 |
| Temperature, °C | 22 | 10 | 10 | 12 | 12 |
| Polymerization time, mins | 215 | 250 | 122 | 220 | 150 |
| Second block: | | | | | |
| Benzene, mls | 1,500 | 1,500 | 1,500 | 1,135 | 1,000 |
| Butadiene-1,3, mls | 550 | 680 | 850 | 500 | 950 |
| Temperature, °C | 50–60 | 50–60 | 50–60 | 50–60 | 50–60 |
| Time, mins | 105 | 120 | 150 | 130 | 130 |
| Coupling: | | | | | |
| Dichloro dimethyl silane, mmoles | 32.6 | 37.2 | 47 | 49 | 59 |
| Polymer properties: | | | | | |
| Intrinsic viscosity, dl./g | 0.62 | 0.88 | 0.94 | 0.60 | 0.71 |
| α-methylstyrene, weight percent | 39 | 31 | 19 | 37 | 31 |
| Percent 1,4 content of polybutadiene, weight percent | 75 | 79 | 77 | 60 | 77 |
| Tensile strength, kg./cm.² at— | | | | | |
| 22° C | 253 | 258 | >121 | 290 | 175 |
| 60° C | 71 | >84 | >17 | >90 | >59 |
| Ball rebound at 0° C., percent | 63 | 61 | 64 | 48 | |

Example 6 (comparative experiments)

Using 32 ounce glass bottles block copolymers were prepared using tetrahydrofuran in place of di-alkyl ether. The volume shown in Table VI of dry benzene was added to a 32 ounce bottle followed by 150 ml. of dry hexane for experiment No. 1. To the solvent was added the volume indicated of purified alphamethylstyrene, followed by the purified tetrahydrofuran. After purging of impurities by the incremental addition of small quantities of n-butyl lithium until a pale yellow was produced, the calculated quantity of n-butyl lithium was added. The bottles were then cooled to the temperatures shown for the polymerization of the aphamethylstyrene. After the expiration of the indicated elapsed time, the calculated volume of purified butadiene-1,3 was added and polymerization of the butadiene was allowed to proceed for the time shown in Table VI. Coupling of the 2-block copolymer was achieved by the addition of the volume shown of carbonyl sulphide, thus yielding the 3-block copolymer The polymer was recovered as described in Example 5. The properties of the copolymers are listed in Table VI. It is noted that these copolymers, although they possess excellent strength properties do not give good figures for ball rebound indicating a poor resilience.

TABLE VI

| Experiment number | No. 1 | No. 2 |
|---|---|---|
| First block: | | |
| Benzene, mls | 350 | 500 |
| Hexane, mls | 150 | |
| Tetrahydrofuran, mls | 20 | 25 |
| α-methylstyrene, mls | 55 | 77 |
| Butyl lithium, mmoles | 8 | 3 |
| Temperature, °C | −15 | 0 |
| Polymerization time, hours | 16 | 16 |
| Second block: | | |
| Butadiene-1, 3, mls | 120 | 85 |
| Temperature, °C | −15 | 0 |
| Polymerization time, hours | 2 | 4 |
| Coupling: | | |
| Carbonyl sulphide, mls | 80 | 100 |
| Polymer properties: | | |
| Intrinsic viscosity, dl./g | 0.35 | 1.02 |
| α-methylstyrene, weight percent | 32 | 37 |
| Percent 1,4 content of polybutadiene, weight percent | 24 | 24 |
| Tensile strength, kg./cm.₂ at— | | |
| 22° C | 202 | 135 |
| 60° C | 58 | 70 |
| Ball rebound at 0 °C., percent | 18 | 41 |

Example 7 (comparative)

A styrene-butadiene-styrene block copolymer having a molecular weight somewhat higher than that of the polyalphamethylstyrene - polybutadiene - polyalphamethylstyrene polymer of run B of Example 3 was prepared and tested for purposes of comparison.

The polystyrene-polybutadiene-polystyrene block copolymer was prepared by adding 25.1 mls. (22.8 gms.) styrene and 4.6 m. moles of sec-butyl lithium to 500 mls. dry benzene solvent in a polymerization bottle. Polymerization proceeded for one hour at 50° C., after which time all the styrene had polymerized. 91 mls. (57 gms.) butadiene was then added, polymerization continued for 3 hours at 50° C., and then the resulting 2-block copolymer solution was cooled to room temperature. 50 mls. of carbonyl sulphide was then added gradually, to effect coupling and form the 3-block copolymer. The product was then recovered in ethanol.

The product had an intrinsic viscosity of 0.57, which corresponds to a molecular weight of about 45,000. The styrene content was about 28.6 wt. percent. It had a tensile strength of only 27 kg./cm.$^2$ and an elongation at break of 900%. The very low tensile strength of this block copolymer makes it virtually useless for most applications. This should be contrasted with the tensile strengths of the compositions of Examples 3 and 4, which in fact had lower molecular weights than this comparative polystyrene-polybutadiene-polystyrene polymer.

These examples show that a superior balance of stress-strain properties and thermoplastic flow properties can be achieved with the block copolymers of the present invention as compared with previously known block cooplymeric thermoplastic rubbers. The polyalphamethylstyrene-polybutadiene-polyalphamethylstyrene copolymers of low molecular weight show satisfactory tensile strength and good thermoplastic flow properties whereas polystyrene-polybutadiene-polystyrene copolymers at similar molecular weights have very little strength. If polystyrene-polybutadiene-polystyrene copolymers are prepared having higher molecular weights and tensile strengths comparable to those of the low molecular weight polyalphamethylstyrene-polybutadiene - polyalphamethylstyrene copolymers the thermoplastic flow properties are very poor. The higher molecular weight polyalphamethylstyrene-polybutadiene-polyalphamethylstyrene copolymers possess a good balance of physical properties including tensile strength and resilience and good retention of these properties at elevated temperatures.

Whilst the invention has been particularly described in connection with butadiene-containing block copolymers, it will be readily appreciated that it is not limited thereto. The non-terminal polymeric block B may be a polymer of isoprene, 2,3-dimethyl butadiene, piperylene, copolymers of these monomers and copolymers of those with butadiene, copolymers of butadiene with styrene and/or acrylonitrile, amorphous copolymers of ethylene and propylene and other elastomeric polymers or copolymers known in the art. Conjugated diolefinic hydrocarbon monomers are preferred.

The products of the invention are useful in coatings, laminates and for making moulded goods such as shoe soles. They are also useful as adhesives, both in hot melt form, solution form and other conventional adhesives systems.

What is claimed is:

1. A process of preparing an improved thermoplastic, rubbery block copolymer having two terminal blocks of polyalphamethylstyrene and a rubbery non-terminal discrete polymeric block of a conjugated diolefinic hydrocarbon, the content of said conjugated diolefinic hydrocarbon being from about 50 to about 90 weight percent, the intrinsic viscosity of said block copolymer as measured in toluene at 30° C. being from about 0.25 to about 1.0, which comprises polymerizing alphamethylstyrene, in solution in an inert hydrocarbon solvent, by means of a monofunctional initiator of anionic polymerization, adding to the living polymer of alphamethylstyrene so formed a conjugated diolefinic hydrocarbon and polymerizing the conjugated diolefinic hydrocarbon onto the living end of said alphamethylstyrene polymer, and adding to the living 2-block copolymer so formed a coupling reagent to effect coupling of said living 2-block copolymer, the improvement comprising adding as polar additive a dialkyl monoether to the alphamethylstyrene prior to polymerizing said alphamethylstyrene, the monofunctional initiator of anionic polymerization being butyl lithium, the alphamethylstyrene being polymerized at a temperature below about 15° C. and the conjugated diolefinic hydrocarbon being polymerized at a temperature above about 50° C.

2. The process of Claim 1 wherein said coupling reagent is selected from the group consisting of carbonyl sulphide, halogens, dihalo-hydrocarbons, carbon disulphide, carbon dioxide and dihalo-dihydrocarbyl-silanes.

3. The process of Claim 1 wherein the alkyl groups of said dialkyl mono ether contain from three to six carbon atoms.

4. The process of Claim 3 in which the dialkyl mono ether is di-(n-butyl) ether.

5. The process of Claim 2 wherein the coupling reagent is a dihalo-dihydrocarbyl-silane in which the halogen is selected from chlorine and bromine and the hydrocarbyl group is selected from alkyl and aryl groups containing from 1 to 6 carbon atoms.

6. The process of Claim 4 in which the molar ratio of di-(n-butyl) ether to monofunctional initiator of anionic polymerization is at least about 1:1.

7. The process of Claim 1 in which the conjugated diolefinic hydrocarbon is selected from butadiene-1,3 and isoprene.

8. The process of Claim 2 wherein the conjugated diolefinic hydrocarbon is butadiene-1,3, the thermoplastic, rubbery block copolymer formed containing from about 55 to about 85 weight percent of polybutadiene having a 1,4 content of at least about 50%.

References Cited

UNITED STATES PATENTS

| | | | |
|---|---|---|---|
| 3,686,365 | 8/1972 | Sequeira | 260—880 B |
| 3,070,574 | 12/1962 | Kastning et al. | 260—45.5 |
| 3,346,666 | 10/1967 | Dennis | 260—879 |
| 3,598,884 | 8/1971 | Wei | 260—876 |
| 3,598,887 | 8/1971 | Darcy et al. | 260—879 |

JAMES A. SEIDLECK, Primary Examiner

U.S. Cl. X.R.

260—880 B